United States Patent

[11] 3,621,948

[72] Inventors Keene P. Dimick
Santa Rosa;
Anthony J. Iozzi, Moraga; Earl L. Jackson,
San Francisco, all of Calif.
[21] Appl. No. 834,976
[22] Filed June 20, 1969
[45] Patented Nov. 23, 1971
[73] Assignee Lifecycle, Inc.
Concord, Calif.

[54] AUTOMATIC FRICTION BRAKING SYSTEM
12 Claims, 6 Drawing Figs.

[52] U.S. Cl. .................................................. 188/186,
242/75.44
[51] Int. Cl. ...................................................... B60t 13/74
[50] Field of Search .......................................... 188/180,
181 C, 181 T, 186, 188, 158; 303/20, 21;
242/75.44, 75.47, 75.5, 156–156.2

[56] References Cited
UNITED STATES PATENTS
3,049,313  8/1962  Jordan et al. ................. 242/75.44

*Primary Examiner*—Duane A. Reger
*Attorney*—Flehr, Hohbach, Test, Albritton & Herbert ABSTRACT: An automatic friction braking system including a brake wheel with an encircling brake band. The brake band is coupled to a pulley biased in a direction opposite the differential tension in the brake band by a spiral spring. A motor operated cam adjusts the tension in the brake band. A potentiometer is coaxially mounted with the pulley to indicate the degree of rotation of the pulley and thus torque load on the brake wheel and is coupled through a closed loop servosystem to the loading motor. A dual potentiometer is also provided for indicating the power dissipation of the brake wheel.

PATENTED NOV 23 1971
3,621,948
SHEET 1 OF 2
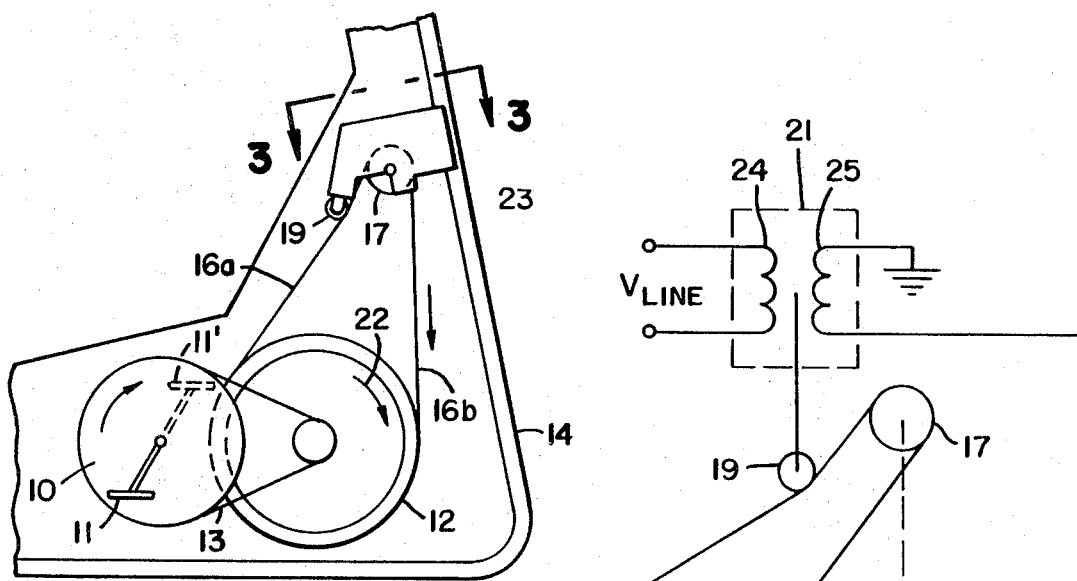
FIG_1
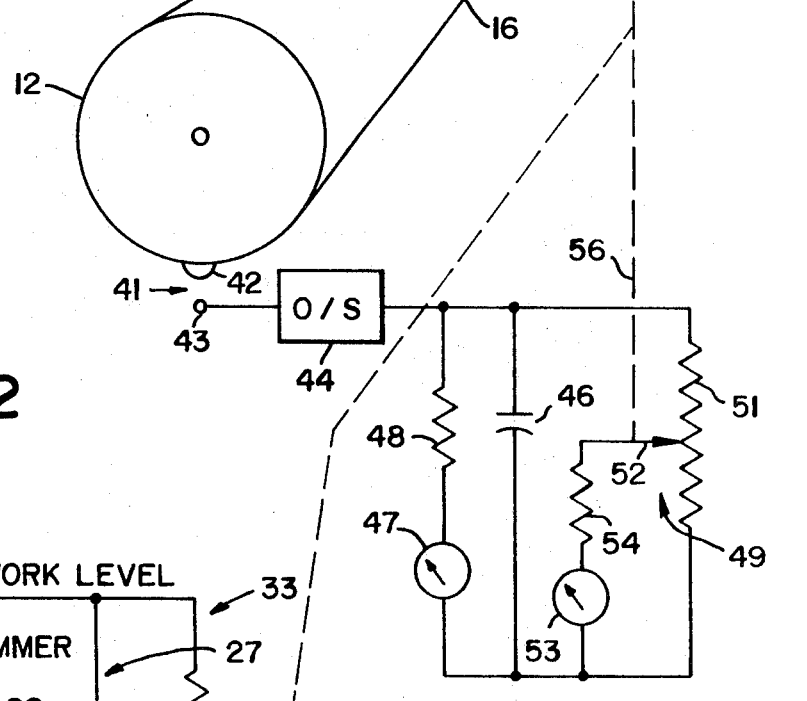
FIG_2
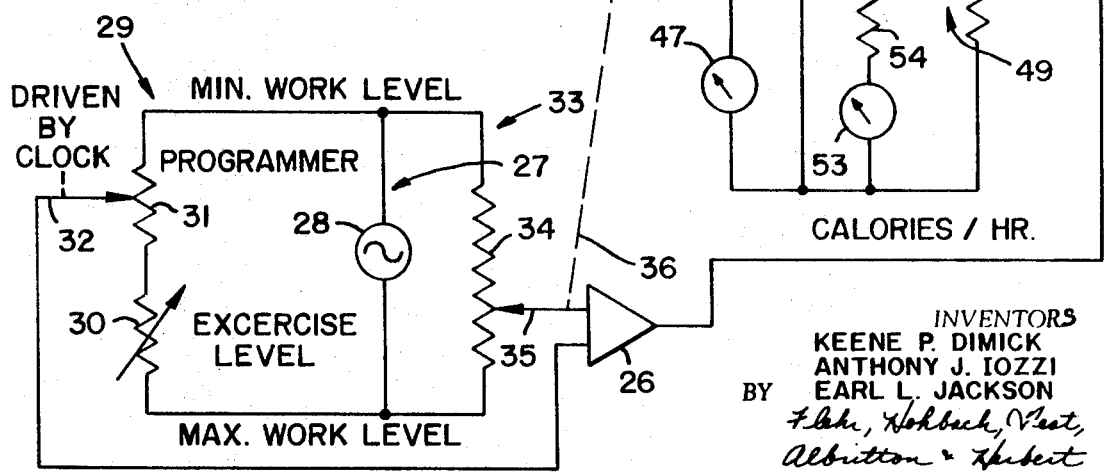
INVENTORS
KEENE P. DIMICK
ANTHONY J. IOZZI
BY EARL L. JACKSON
*Flehr, Hohbach, Vest,
Albritton & Herbert*
ATTORNEYS

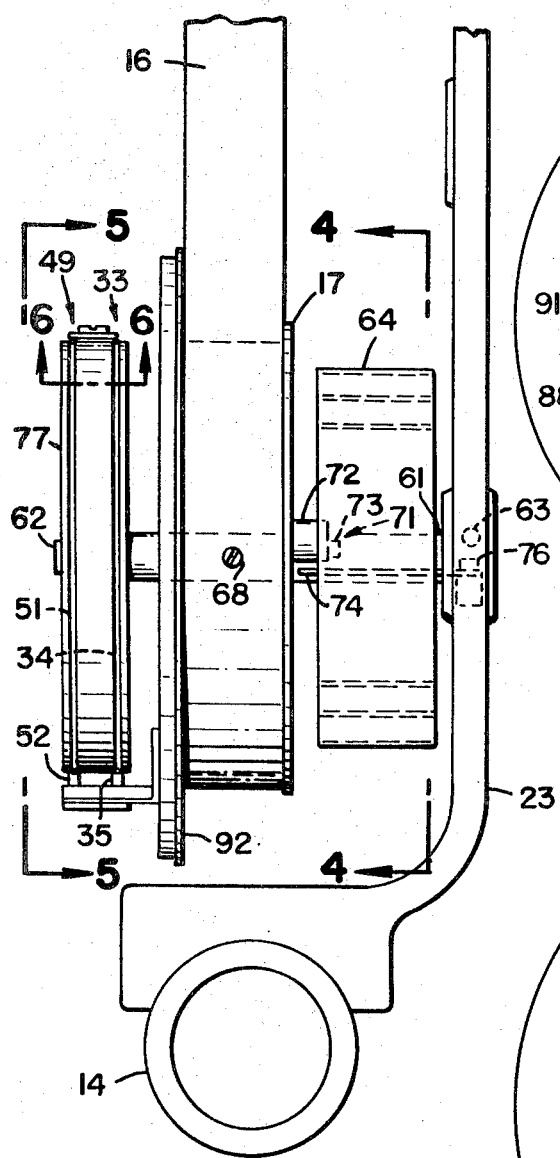
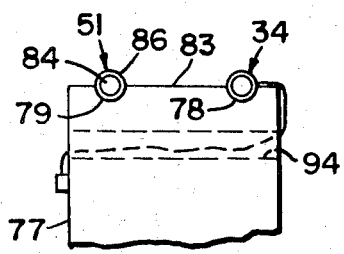
FIG_3
FIG_6
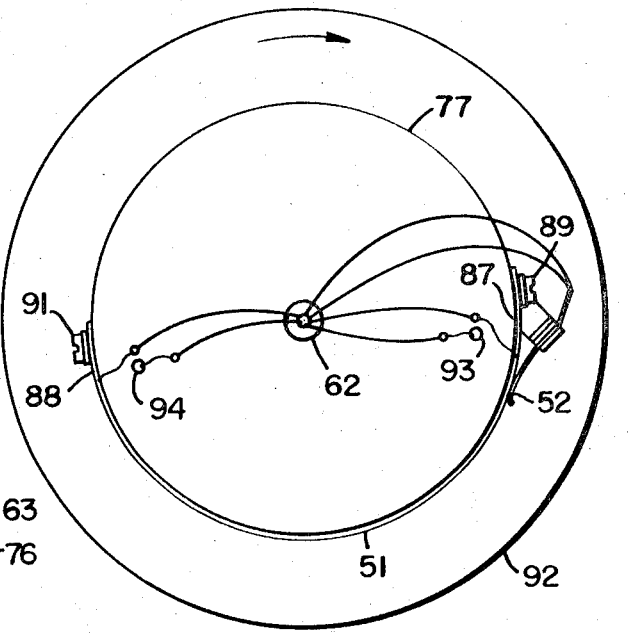
FIG_5
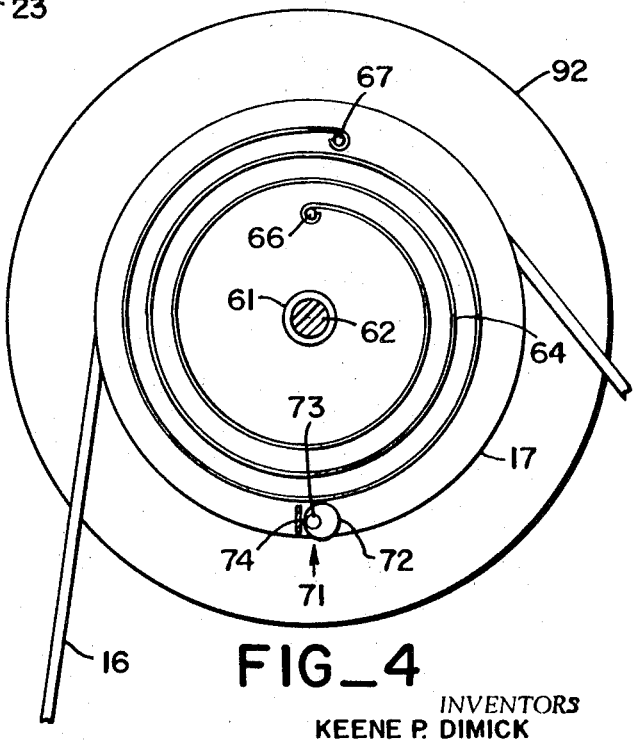
FIG_4
INVENTORS
KEENE P. DIMICK
ANTHONY J. IOZZI
EARL L. JACKSON
ATTORNEYS

AUTOMATIC FRICTION BRAKING SYSTEM

BACKGROUND OF THE INVENTION

The present invention is directed to an automatic friction braking system and more particularly to a system for providing a predetermined torque load on a stationary exercise bicycle.

Braking systems for exercise bicycles have been manually controlled by the user. Such a system includes a brake wheel rotatable by pedals, brake band partially encircling the brake wheel, and means for manually varying the tension in the brake band to thereby vary the torque load on the brake wheel. In addition, a mechanical indicator provides a readout of the torque load. When such a system is automated as disclosed in copending application Ser. No. 803,820, filed Mar. 3, 1969, in the name of Keene P. Dimick, entitled "Exercise Apparatus," the manual configuration is unsuitable. For example, the torque load indicating device on a manual device requires excessive space and is not readily converted from a visual torque load indication to produce an electrical signal proportional to torque load. Furthermore, the means for manually varying the tension in the brake band is, in the mechanical configuration, an integral part of the torque load indicator. When a motor is used in place of a rotatable knob, for example, such configuration cannot readily be used.

Lastly, the exercise apparatus as described in the foregoing copending application has additional capabilities and requirements which must be accommodated in a simple and economical manner.

OBJECTS AND SUMMARY OF THE INVENTION

It is, therefore, a general object of the present invention to provide an improved automatic friction braking system.

It is another object of the invention to provide a system as above which is compact, simple in construction, economical and readily lends itself to automation.

In accordance with the above objects there is provided an automatic friction braking system having a rotatable brake wheel, brake band means at least partially encircling the brake wheel and having a differential tension due to rotation of the brake wheel, and means for varying the tension in the brake band means whereby the torque load on the brake wheel is similarly varied. More specifically, the system comprises means for sensing the differential tension of the brake band means including pulley means coupled to the brake band means and including curved spring means biasing the pulley means in opposition to the differential tension. The spring means are coaxial with the pulley means. The degree of rotation of the pulley means is indicative of the torque load on the brake wheel. First potentiometer means are coaxial with the pulley and responsive to the rotation thereof to produce an output signal proportional to the degree of rotation of the pulley means. A reference signal is provided and means for comparing the output signal with the reference signal to produce an error signal. The means for varying the tension in the brake band means is responsive to the error signal to maintain the torque load at a magnitude determined by the reference signal.

BRIEF DESCRIPTION OF THE DRAWINGS

FIG. 1 is an elevation view of an exercise apparatus partially cut away and simplified embodying the present invention;

FIG. 2 is a simplified representation of FIG. 1 including a circuit schematic;

FIG. 3 is an enlarged partial top view taken along line 3—3 of FIG. 1;

FIG. 4 is an elevation view taken along line 4—4 of FIG. 3;

FIG. 5 is an elevation view taken along line 5—5 of FIG. 3; and

FIG. 6 is an enlarged partial cross-sectional view taken along line 6—6 of FIG. 3.

DETAILED DESCRIPTION OF THE PREFERRED EMBODIMENT

Referring now to FIG. 1, there is illustrated an exercise bicycle with only the essential portions shown including a drive sprocket 10 with pedals 11 and 11'. This sprocket is coupled to a brake wheel 12 which also serves as a flywheel by a chain 13. Both the sprocket and brake wheel are mounted on a frame 14. A brake band in the form of a woven belt 16 extends around or partially encircles brake wheel 12 and is fixed to a pulley 17 mounted on frame 14. A cam 19 rides on brake band 16 and is rotated by motor means 21 to adjust the tension in brake band 16. Thus, the total torque load on the brake wheel is similarly varied. In accordance with the well-known friction braking theory, adjustment of the total tension on brake band 16 also changes the differential tension between brake band portion 16a and brake band portion 16b. Rotation of brake wheel 12 in a direction shown by arrow 22 produces this differential tension with the tension in portion 16b in the direction shown being greater than the tension in portion 16a.

Very briefly, in operation the pedals 11 and 11' are loaded with a torque load by the adjustment of the tension on brake band 16 by cam 19 and motor 21. The greater the tension applied, the greater the friction force present on the surface of brake wheel 12 and thus the greater the torque load present at the pedals 11, 11'. Concomitantly, the greater friction load on brake band 16 causes it to turn in the direction shown by the arrows which rotate the pulley 17 in a clockwise direction. As will be explained in detail below, pulley 17 includes a biasing spring which opposes the resultant differential force. Thus the degree of movement of pulley 17 is an indication of the amount of torque load on the pedals 11, 11' and brake wheel 12.

The cam 19, motor 21 and pulley 17 are part of an overall torque bracket designated 23 which is shown in greater detail in FIGS. 3 through 6. Such bracket will be described in conjunction with these figures. However, for a better understanding of the invention, bracket 23 must be placed in the context of the overall exercise apparatus as illustrated in FIG. 2 and as more fully described and claimed in the above-mentioned Dimick copending application entitled "Exercise Apparatus."

Referring particularly to FIG. 2, the motor 21 in combination with cam 19 is part of an overall servosystem to automatically provide a plurality of different successive torque loads in time on pedals 11 and 11' and brake wheel 12. Motor 21 includes a power winding 24 coupled to line voltage, V-line, and a control winding 25 which is coupled to an amplifier 26. Any output signal from amplifier 26 causes activation of servomotor 21 to move cam 19 until such error signal is eliminated or reduced to substantially zero.

More specifically, the control loop for motor 21 includes a bridge circuit, generally indicated at 27, which is supplied a relatively low AC voltage by a source 28. One leg 29 of the bridge includes a program resistor 31 having a moving contact 32 which is driven by a clock motor. Such clock motor is not shown by the present invention but is disclosed in the above-mentioned copending application. Briefly, however, the program resistor 31 provides in effect a reference signal which determines the amount of torque load on brake wheel 12 and pedals 11, 11'. Thus, the exercise apparatus can sequence through several different successive torque loads. In series with program resistor 31 is a variable resistance means 30 designated "exercise level."

The other leg 33 of the bridge 27 is a potentiometer consisting of a resistor 34 having a moving contact 35 which is coupled by a linkage 36 to pulley 17. Potentiometer 33 and its specific configuration and its linkage to pulley 17 includes novel features which will be discussed in conjunction with FIGS. 3 through 6. As discussed previously, the amount of angular rotation of pulley 17 is the measure of the torque load being applied to brake wheel or flywheel 12. Linkage 36 senses this rotation and moves moving contact 35 accordingly.

Bridge circuit 27 in operation causes a difference of potential to appear across moving contacts 32 and 35 and thus the input to amplifier 26 when the contacts are not in the same locations on their respective resistors 31 and 34. In the case of resistor 31 the exercise level adjustable resistor 30 would be theoretically included as a part of resistor 31. Thus, the location of moving contact 32 which is independently determined by the clock motor acts as a reference to which moving contact 35 must ultimately be moved by the control loop which includes amplifier 26, servomechanism motor 21, cam 19, pulley 17 and linkage 36.

As moving contact 32 is moving upwardly toward "minimum work level," contact 35 will necessarily follow and thus cause cam 19 to release much of the pressure on the brake band 16. As friction is reduced on brake wheel 12 there is a minimum work load or torque load on the pedals 11, 11' coupled to flywheel or brake wheel 12. Conversely, movement of the moving contact 32 downwardly toward the "maximum work level" produces a maximum tension in brake band 16.

The rotary speed of brake wheel 12 is sensed by an r.p.m. pickup 41 which may, for example, include a magnet 42 mounted on brake wheel 12 which is sensed by a reed switch 43. The reed switch actuates a one-shot multivibrator 44 which is coupled to an integrating capacitor 46. The integrated magnitude of voltage across the capacitor is a measure of the revolutions per minute or rotary speed of brake wheel 12. The rotary speed is indicated by a meter movement 47 coupled in series with a relatively high resistance 48 which is across the two terminals of capacitor 46. Such meter 47 would indicate to the user the speed at which he was pedaling brake wheel 12.

In accordance with the invention, in order to provide an indication of the power dissipation of the brake wheel a second potentiometer is coupled both to integrating means 46 and to pulley 17. More specifically, potentiometer 49 includes a resistor 51 having a moving contact 52. Resistor 51 is coupled across capacitor 46. Thus, current in resistor 41 is proportional to the rotary speed of brake wheel. In addition, a meter movement 53 in series with a high-impedance resistor 54 is coupled across moving contact 52 and an end of resistor 51. Moving contact 52 is coupled by a linkage 56 to pulley 17. The location of the moving contact on resistor 51 is proportional to the rotary movement of pulley 17 which in turn is proportional to the torque load on brake wheel 12. Thus, the magnitude of voltage sensed at moving contact 52 by meter 53 is equivalent to the product of the torque load and rotary speed which is in effect the power dissipation of brake wheel 12.

In accordance with the invention, means are provided for sensing the differential tension in brake band 16 and as best illustrated in FIGS. 3 through 5 includes the pulley 17 which is mounted on the torque bracket 23 fixed to frame 14. Pulley 17 is mounted for rotation on a sleeve 61 which in turn is fitted on a shaft 62 fixedly mounted on bracket 23 by a setscrew 63. Curved spring means in the form of a spiral-type spring 64 (FIG. 4) biases the pulley 17 in opposition to the differential tension of brake band 16. This spring is concentric with shaft 62 and has one end 66 fixed to bracket 23 and the other end 67 affixed to pulley 17. Brake band 16 is affixed to pulley 17 by a screw 68. The spiral-type spring 64 provides for approximately 130° of rotation of pulley 17.

Stop means for limiting the rotation of pulley 17 in the biasing direction of spring 64 include adjustable eccentric means 71. These comprise a cylinder 72 which is eccentrically mounted on the pulley 17 by a machine screw 73. The stop spring 74 is mounted on bracket 23 by a machine screw 76. Stop spring 74 is relatively resilient to provide a cushion for the stopping of pulley 17 when tension is released from brake band 16 by the cam 19. The eccentric cylinder 72 during the initial construction of the torque bracket assembly 73 allows for initial adjustment of the zero point of pulley 17 as will be described below.

A disk 77 of electrical insulating material is fixed on shaft 62 and as best illustrated in FIG. 6 includes rim grooves 78 and 79 for receiving the resistor portion 34 of potentiometer 33 and resistor 51 of potentiometer 49. This is also shown in FIG. 5. Each resistor 34 and 51 includes a center insulated wire 84 on which is helically wound on a conductor 86. The number of turns per inch of wire 86, of course, determine the resolution of the system but the fineness of the wire is limited by mechanical durability considerations. Inner wire 84 includes ends 87 and 88 which are mounted to disk 77 by screws 89 and 91 respectively. Such screws are common to both potentiometers.

Potentiometers 33 and 49 also include moving contacts or brushes 35 and 52 which are mounted for rotation with sleeve 61 on an insulating disk 92. As best shown in FIGS. 5 and 6, the various electrical conductors coupling the brushes 52 and 53 and the resistors 34 and 51 extend through the center shaft 62. The conductors for resistor 34 are coupled to the outer side of disk 77 through holes 93 and 94 in the disk 77.

In order to adjust the relative location of resistors 34 and 51 in relation to their respective brushes 35 and 52, spiral spring 64 is constructed so that a 12-pound force on pulley 17 produces a full scale movement of pulley 17 and the brushes 35 and 52. This is approximately 130°. More particularly in adjusting the disk 77 by means of setscrew 63 a 1-pound weight is hung on pulley 17. Since this is one-twelfth of the maximum deflection, rotation of pulley 17 is 8.33 percent of full scale value. Knowing the resistance values of resistors 34 and 51 the equivalent electrical voltage signal is also known. Thus, by the use of appropriate measuring apparatus which nulls out on this 8.33 percent value when disk 77 is rotated to the proper position pulley 17 may be positioned relative to the brush means by the above method. When the positioning procedure is finished, setscrew 63 is tightened to permanently fix the location of disk 77.

Thus, the present invention by fixing the location of potentiometers 33 and 49 relative to the brushes 35 and 52 provides for superior zeroing in of the system as opposed to adjustment of the location of movable brush means 52 and 35. Moreover, the coaxial mounting of potentiometers 33 and 49 in the manner set forth above with pulley 17 is space saving, simple, economical and allows for easy transmission of information as to the rotary position of pulley 17 which is an indication of the torque load on brake wheel 12 to the appropriate comparison-type control circuits. The use of double potentiometers 33 and 49 provides both control of the tension-loading means including cam 19 and motor 21 and in addition the indication of power dissipation by the brake wheel without any need for expensive and complicated electrical isolation between these two systems which would otherwise be necessary if only one potentiometer were used. The potentiometers themselves are of relatively simple construction as illustrated in FIG. 5 with the use of the grooves 78, 79 in disk 77 and the mounting screws 89, 91. Brushes 35 and 52 are relatively lightweight material so that the friction load of the potentiometer on the entire pulley assembly 17 is negligible.

The use of the spiral spring 64 allows a large degree of rotation, for example at least 130°, and combined with the structure of the potentiometer provides for good resolution. More specifically in the practical use of the present invention in the environment of an exercise apparatus, the exercise level resistor 30 as illustrated in FIG. 2 might provide a program level where perhaps only 20 percent of the torque loading capacity of the exercise apparatus is used. Thus, only 20 percent of the potentiometer would be used and this 20 percent would necessarily provide all changes in exercise level desired. As disclosed in the above-mentioned copending application, normally at least nine different settings are required. For adequate resolution there must be a sufficient angle of movement even for a 20 percent exercise level. The overall 130° movement provided by the spiral spring gives this resolution.

Thus, the present invention has provided an improved automatic friction braking system which is compact, simple in construction, economical and readily lends itself to automation.

We claim:
1. An automatic friction braking system having a rotatable brake wheel, brake band means at least partially encircling said brake wheel and having a differential tension due to rotation of said brake wheel, and means for varying the tension in said brake band means whereby the torque load on said brake wheel is similarly varied said system comprising: means for sensing the differential tension in said brake band means including pulley means coupled to said brake band means, and including curved spring means biasing said pulley means in opposition to said differential tension said spring means being coaxial with said pulley means, the degree of rotation of said pulley means being indicative of said torque load on said brake wheel; first potentiometer means coaxial with said pulley means and responsive to the rotation thereof to produce an output signal proportional to said degree of rotation of said pulley means; means for providing a reference signal; and means for comparing said output signal with said reference signal to produce an error signal, said means for varying said tension being responsive to said error signal to maintain said torque load at a magnitude determined by said reference signal.

2. An automatic friction braking system as in claim 1 together with means for sensing the rotary speed of said brake wheel, second potentiometer means coaxial with said pulley means and responsive to the degree of rotation thereof; and power-indicating means coupled to said speed-sensing means and said second potentiometer means for indicating the power dissipation of said brake wheel.

3. An automatic friction braking system as in claim 2 where said second potentiometer means includes a resistor with a moving contact having a location on said resistor corresponding to said degree of rotation of said pulley means, and where said speed-sensing means is coupled across said resistor to produce a current through said resistor proportional to said rotary speed said power-indicating means including voltmeter means coupled to said moving contact for sensing the magnitude of voltage at said moving contact said voltage being proportional to the product of said torque load and said rotary speed whereby the power dissipation of said brake wheel is indicated by said voltmeter means.

4. An automatic friction braking system as in claim 1 where said curved spring means is a spiral-type spring.

5. An automatic friction braking system as in claim 1 where said first potentiometer means includes, a disk mounted coaxially with said spring means said disk having a groove in its rim, a helically wound conductor mounted in said groove, and brush means engaging said conductor, said brush means and disk having relative movement between each other as determined by said degree of rotation of said pulley means.

6. An automatic friction braking system as in claim 5 together with second potentiometer means similar to said first potentiometer means and mounted in another groove in said rim.

7. An automatic friction braking system as in claim 5 where said conductor is wound on an insulated wire said wire having two ends and being mounted in said groove by fastening means at each of said ends.

8. An automatic friction braking system as in claim 7 together with second potentiometer means similar to said first potentiometer means and mounted in another groove in said rim said fastening means being common to both potentiometers.

9. An automatic friction braking system as in claim 8 where said fastening means are screws.

10. An automatic friction braking system as in claim 1 where said pulley means includes stop means having adjustable eccentric means for limiting rotation of said pulley means in said bias direction.

11. An automatic friction braking system as in claim 1 where said first potentiometer means includes brush means mounted for rotation with said pulley means, means carrying a resistor engaging said brush means, and means for positioning said resistor relative to said brush means while said pulley means is in a predetermined position.

12. An automatic friction braking system as in claim 11 where said positioning means includes a setscrew.

* * * * *